United States Patent
Nammi et al.

(10) Patent No.: US 8,634,794 B2
(45) Date of Patent: Jan. 21, 2014

(54) MULTI-USER INTERFERENCE CANCELLATION IN A SINGLE-CARRIER RADIO RECEIVER

(75) Inventors: Sairamesh Nammi, Dallas, TX (US); Narendra Tilwani, Addison, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 647 days.

(21) Appl. No.: 12/854,633

(22) Filed: Aug. 11, 2010

(65) Prior Publication Data
US 2012/0040633 A1 Feb. 16, 2012

(51) Int. Cl.
*H04B 1/10* (2006.01)

(52) U.S. Cl.
USPC ........ 455/296; 455/67.13; 455/228; 455/295; 714/755

(58) Field of Classification Search
USPC ............... 455/296, 63.1, 114.2, 278.1, 67.11, 455/67.13, 104, 102, 226.1, 228, 295, 130, 455/229, 230, 506, 501, 503–504; 375/148, 375/316, 341, 347; 370/235, 328, 412; 714/755, 786, 758
See application file for complete search history.

(56) References Cited

U.S. PATENT DOCUMENTS

| | | | | |
|---|---|---|---|---|
| 5,541,955 A | * | 7/1996 | Jacobsmeyer | 375/222 |
| 6,161,209 A | * | 12/2000 | Moher | 714/780 |
| 6,981,203 B2 | * | 12/2005 | Mills | 714/794 |
| 6,983,412 B2 | * | 1/2006 | Fukumasa | 714/755 |
| 7,076,168 B1 | * | 7/2006 | Shattil | 398/76 |
| 8,261,169 B2 | * | 9/2012 | Kishigami et al. | 714/794 |

* cited by examiner

*Primary Examiner* — Pablo Tran

(57) ABSTRACT

A method, apparatus, and radio receiver system for canceling multi-user interference in a single-carrier radio communication system. A front-end receiver such as a RAKE receiver receives a radio signal formatted in a sequence of frames, and outputs a plurality of user signals. A processing selector selects on a frame-by-frame basis, either a first signal processing chain that serially decodes and removes the interference contributions of the user signals, or a second signal processing chain that simultaneously decodes and removes the interference contributions of the user signals in parallel. The processing selector may select the first signal processing chain when the number of user signals is greater than or equal to a threshold value, and may select the second signal processing chain when the number of user signals is less than the threshold value.

10 Claims, 4 Drawing Sheets

MULTI-USER INTERFERENCE CANCELLATION IN A SINGLE-CARRIER RADIO RECEIVER

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to radio communication systems. More particularly, and not by way of limitation, the present invention is directed to a method and apparatus in a radio receiver for canceling multi-user interference in a single-carrier radio communication system.

In the reverse link of single-carrier radio communication systems such as Code Division Multiple Access (CDMA) systems, all users share the same frequency and time resources. Each user is differentiated by a unique long Pseudo-random Noise (PN) sequence. Since the user codes are not perfectly orthogonal, each user causes interference to all the other in-cell users. Hence the performance (for example capacity) is interference limited. An interference-canceling scheme can enhance the performance of such systems.

There are a number of canceling schemes in the literature, which describe ways to remove the multi-user interference. Such schemes include, for example, Maximum Likelihood Detection (MLD) interference cancellation. Even though the performance of MLD is quite good in terms of Bit Error Rate (BER) or capacity, the complexity increases exponentially as the number of users increases. With a large number of users, MLD becomes highly impractical. On the other hand, filter-based techniques such as Matched Filter (MF) and Minimum Mean Square Error (MMSE) are less complex to implement but their performance is sub-optimal, especially at low signal-to-interference-plus-noise ratio (SINR).

SUMMARY

In one embodiment, the present invention is directed to a method in a radio receiver node for canceling multi-user interference in a single-carrier radio communication system in which a front-end receiver receives a radio signal formatted in a sequence of frames, and each frame includes a plurality of user signals, each user signal contributing to the multi-user interference. The method includes the steps of determining for each frame, whether the number of user signals is greater than or equal to a threshold value; upon determining that the number of user signals is greater than or equal to the threshold value, serially decoding and removing the interference contributions of the user signals one at a time; and upon determining that the number of user signals is less than the threshold value, simultaneously decoding and removing the interference contributions of the user signals in parallel.

When serially decoding the user signals, the method may sort the user signals according to a signal quality measure such as signal-to-interference-plus-noise ratio (SINR) and attempt to decode the user signals in descending order of received signal quality. If a user signal is successfully decoded, its corresponding interference contribution is removed from the received radio signal. When one or more user signals fail to be decoded, the failed user signals are bypassed, and an attempt is made to decode a next subsequent user signal. When the next subsequent user signal is successfully decoded, its interference contribution is removed, and the method then re-attempts to decode the previously failed user signals in descending quality order. The method stops when all user signals have been successfully decoded or when all remaining undecoded user signals have twice failed decoding attempts.

When parallel decoding the user signals, an attempt is made to simultaneously decode all of the user signals utilizing parallel decoders. When at least one of the user signals is successfully decoded, the interference contributions of the decoded user signals are removed from the received signal, and an attempt is made to simultaneously decode all of the failed user signals. Additional attempts may be made to simultaneously decode all of the failed user signals until all user signals have been successfully decoded or when a decoding attempt does not produce any successfully decoded user signals.

In another embodiment, the present invention is directed to an apparatus in a radio receiver node for canceling multi-user interference in a single-carrier radio communication system in which a front-end receiver receives a radio signal formatted in a sequence of frames, and each frame includes a plurality of user signals, each user signal contributing to the multi-user interference. The apparatus includes a processor for controlling the apparatus to decode the user signals and remove corresponding interference contributions of each decoded user signal; and a first signal processing chain that serially decodes and removes the interference contributions of the user signals. The first signal processing chain includes means for sorting the user signals according to signal quality in descending order starting with the user signal with the highest signal quality; a decoder for attempting to decode the user signal having the highest received signal quality, and when the user signal having the highest received signal quality is successfully decoded, for attempting to decode subsequent user signals in descending order of received signal quality; and an interference removal unit for removing from the received signal, the interference contribution of user signals that are successfully decoded.

The processor may control the decoder to bypass any of the user signals that fail to be decoded, and to attempt to decode a next subsequent user signal. When the next subsequent user signal is successfully decoded, the processor controls the decoder to re-attempt to decode the previously failed user signals in descending quality order before proceeding to the next subsequent user signal. Decoding stops when all user signals have been successfully decoded or when all remaining undecoded user signals have twice failed decoding attempts.

The apparatus may also include a second signal processing chain that simultaneously decodes and removes the interference contributions of the user signals in parallel utilizing a number of parallel decoders. A load measurement unit determines for each frame, whether the number of user signals is greater than or equal to a threshold value, and a selector selects the first signal processing chain upon determining that the number of user signals is greater than or equal to the threshold value, and selects the second signal processing chain upon determining that the number of user signals is less than the threshold value.

In another embodiment, the present invention is directed to a radio receiver system in a single-carrier radio communication network for receiving a radio signal comprising a plurality of user signals and for canceling multi-user interference between the plurality of received user signals, wherein the radio signal is formatted in a sequence of frames, and each frame includes the plurality of user signals. The receiver system includes a front-end receiver for detecting the radio signal and outputting the plurality of user signals; a first signal processing chain that serially decodes and removes the interference contributions of the user signals; a second signal processing chain that simultaneously decodes and removes the interference contributions of the user signals in parallel; and means for selecting the first signal processing chain or the second signal processing chain for processing each received frame. A processor may control the selecting means to select the first signal processing chain when the number of user signals is greater than or equal to a threshold value, and to select the second signal processing chain when the number of user signals is less than the threshold value.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

For the exemplary embodiments that follow, it is assumed that N users are in the same sector and are transmitting at a given time instant t. A front-end receiver in a receiver node receives the multiple signals and provides the received signals to a back-end interference canceller, which performs the claimed method. The operation of the interference canceller may be controlled by a processor executing computer program instructions stored on a memory. Alternatively, the interference canceller may be implemented in hardware, firmware, or a combination of software, hardware, and firmware.

Figure 1:
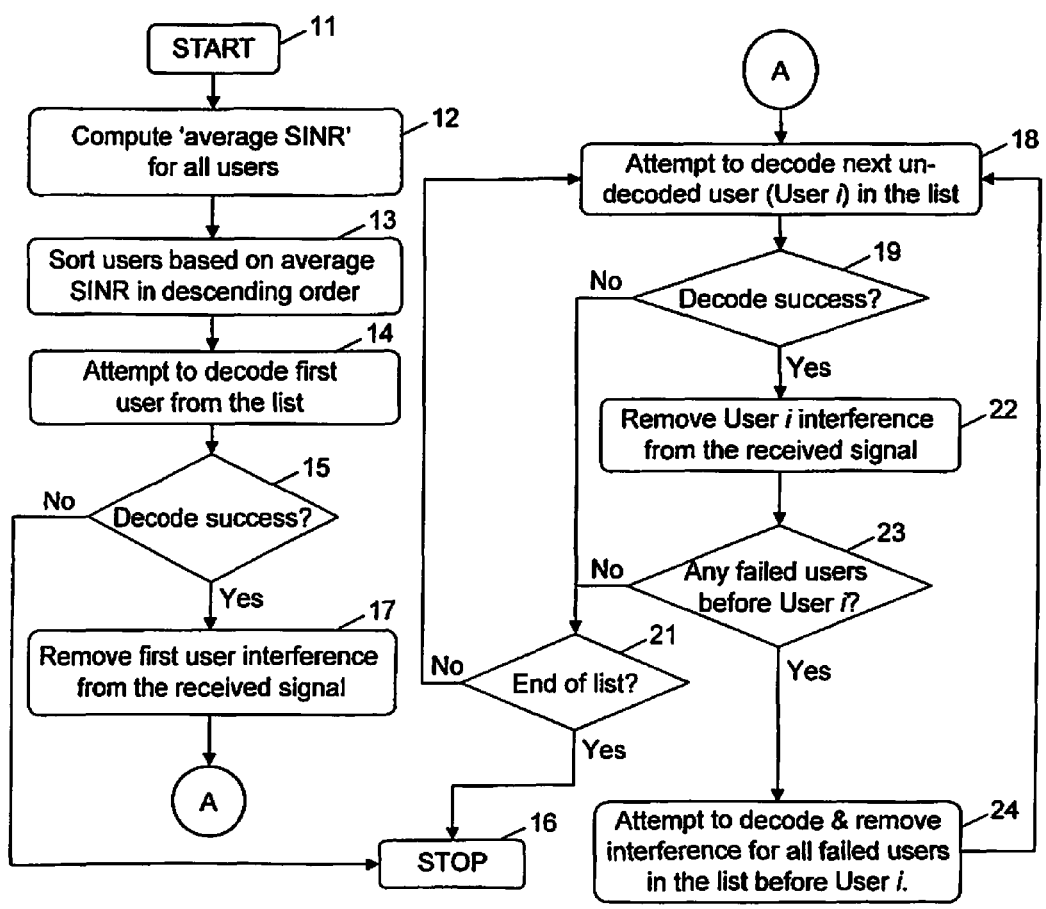
FIG. 1 is a flow chart illustrating the steps of a first exemplary embodiment of the method of the present invention.

FIG. 1 is a flow chart illustrating the steps of a first exemplary embodiment of the method of the present invention. This embodiment determines an order for the user signals, and serially decodes the user signals and removes the interference contribution of each user signal from the received radio signal in the determined order. This embodiment is optimal when there are a high number of user signals in the received radio signal. Briefly, the method starts with the user signal having the highest received signal quality and attempts to decode the user signals in descending quality order. If a user signal is successfully decoded, its corresponding interference contribution is removed from the received radio signal. User signals that fail the decoding attempt are bypassed. Subsequently, if a user signal with lower signal quality is successfully decoded, its interference contribution is removed and the method then goes back and attempts to decode the user signals that previously failed. The method then proceeds in a like manner, attempting to decode the remaining user signals. Signal quality may be determined in one embodiment, for example, as the average signal-to-interference-plus-noise ratio (SINR) at the output of the front-end receiver detector (for example, a RAKE receiver).

The method starts at step 11 and moves to step 12 where the interference canceller computes an average frame SINR for each of the users. At step 13, the users are sorted into a list based on their average SINR in descending order with the highest SINR first. At step 14, an attempt is made to decode the first user at the top of the list. At step 15, it is determined whether the decoding attempt was successful. If not, then no other attempts to decode users need to be performed since it is known that the remaining users, with lower SINRs, will also fail. Therefore, the method stops at step 16. However, if the decoding is successful, the method moves to step 17 where the first user's signal is reconstructed and the interference contribution of the first user is removed from the received signal utilizing known techniques.

The method then moves to step 18 where an attempt is made to decode the next un-decoded user in the list (User i). At step 19, it is determined whether the decoding attempt was successful. If not, the method moves to step 21 where it is determined whether the method has reached the end of the list. If so, the method moves to step 16 and stops. However, if the method has not reached the end of the list, the method returns to step 18 where an attempt is made to decode the next un-decoded user in the list. When User i is successfully decoded, the method moves to step 22 where the interference canceller removes User i's interference contribution from the received signal utilizing known techniques.

At step 23, it is determined whether there are any higher SINR users who failed before User i succeeded. If not, the method moves to step 21 where it is determined whether the method has reached the end of the list. If so, the method moves to step 16 and stops. However, if the method has not reached the end of the list, the method returns to step 18 where an attempt is made to decode the next un-decoded user in the list. However, if there is at least one higher SINR users who failed before User i succeeded, the method moves to step 24 where a second attempt is made to decode the failed users, starting from the top of the list until User i. Once the second decoding attempt has been made for all the failed users before User i, the method returns to step 18 where an attempt is made to decode the next un-decoded user in the list. The method continues in this manner until reaching the end of the list.

Figure 2:
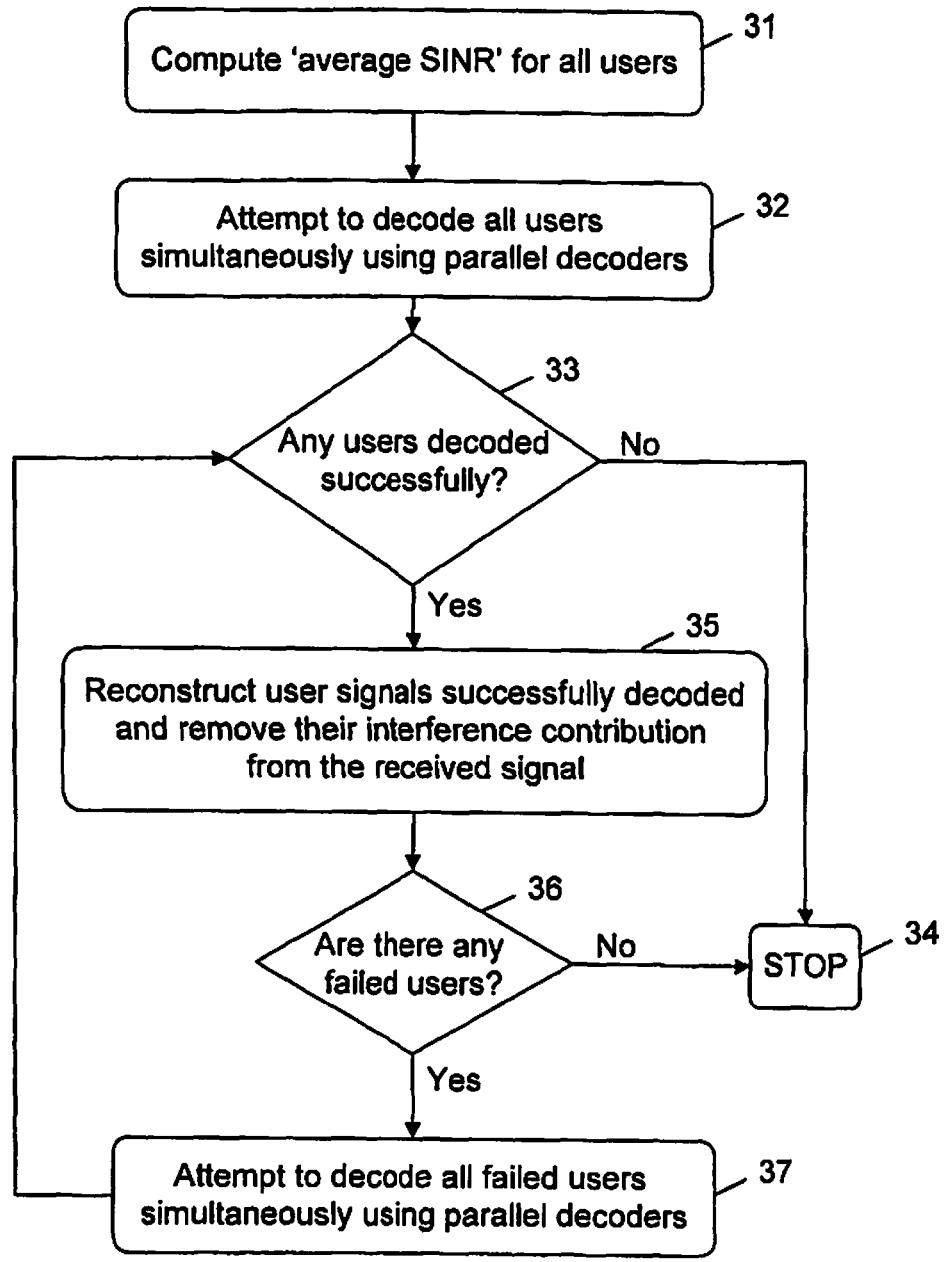
FIG. 2 is a flow chart illustrating the steps of a second exemplary embodiment of the method of the present invention.

FIG. 2 is a flow chart illustrating the steps of a second exemplary embodiment of the method of the present invention. In this embodiment, attempts are made to decode all of the users simultaneously using parallel decoders. After a first iteration, if there are users that failed the first decoding attempt, a second iteration is performed in an attempt to parallel decode all of the failed users. This embodiment is optimal when there are a low number of user signals in the received radio signal.

At step 31, the interference canceller computes an average frame SINR for each of the users. At step 32, an attempt is made to decode all of the users simultaneously using parallel decoders. At step 33, it is determined whether any of the users were successfully decoded. If not, the method stops at step 34. However, if at least one of the users was successfully decoded, the method moves to step 35 where the successfully decoded user signals are reconstructed and their interference contributions are removed from the received signal utilizing known techniques.

At step 36, it is determined whether there are any failed users. If not (i.e., all users were successfully decoded), the method stops at step 34. However, if there are still some failed users, the method moves to step 37 where an attempt is made to decode all of the failed users simultaneously using parallel decoders. The method then returns to step 33 to determine whether any of the failed users were successfully decoded. If not, the method stops at step 34. However, if at least one of the failed users was successfully decoded in this iteration, the method moves to step 35 where the successfully decoded user signals are reconstructed and their interference contributions are removed from the received signal utilizing known techniques. If all of the users have been successfully decoded at this point, the method stops at step 34. Otherwise, the method performs additional iterations of parallel decodings until either all of the users are successfully decoded, or all of the remaining users fail in a given iteration.

Figure 3:
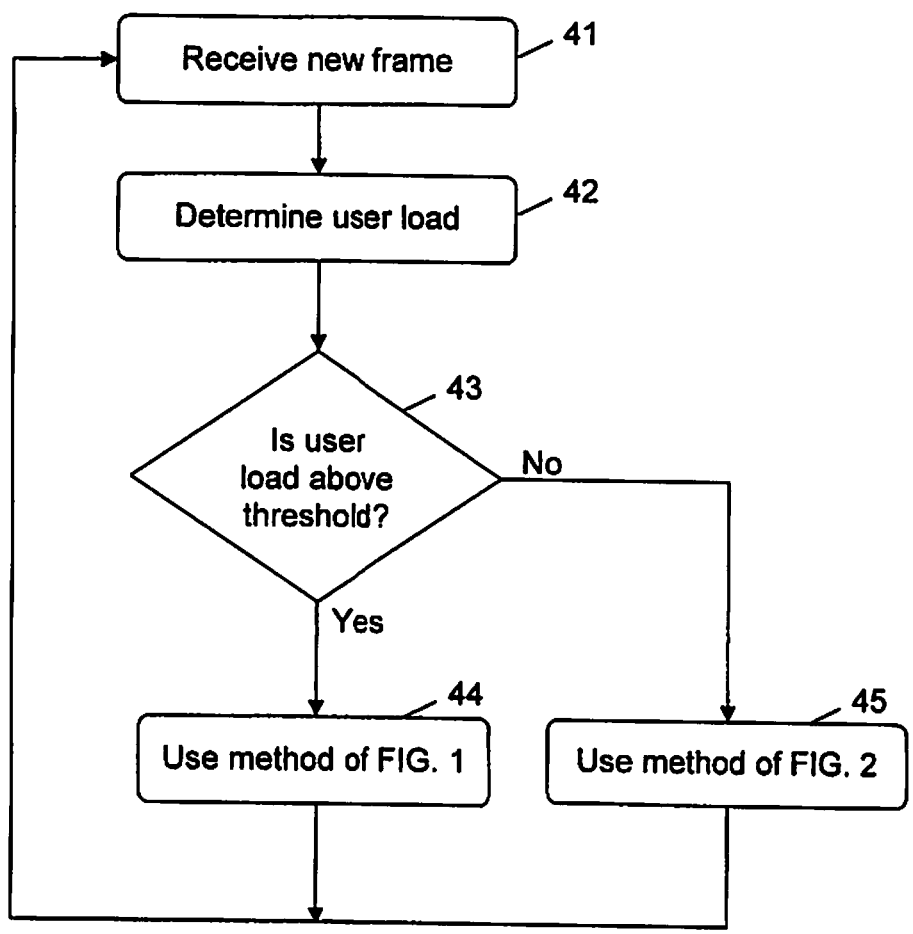
FIG. 3 is a flow chart illustrating the steps of a dynamic process of switching between the methods of FIG. 1 and FIG. 2.

FIG. 3 is a flow chart illustrating the steps of a dynamic process of switching between the methods of FIG. 1 and FIG. 2. As previously noted, the embodiment of FIG. 1 is optimal when there are a high number of user signals in the received radio signal, and the embodiment of FIG. 2 is optimal when there are a low number of user signals in the received radio signal. To optimize the overall performance of the interference canceller, the canceller may dynamically switch between the two embodiments as the user load varies.

At step 41, a new frame is received. At step 42, the user load in the frame is determined. At step 43, it is determined whether the user load is above a threshold level. If so, the process moves to step 44 where the method of FIG. 1 is utilized to order the users, and serially decode the user signals and remove the interference contribution of each user signal from the received radio signal in the determined order. However, if the user load is not above the threshold level, the process moves instead to step 45 where the method of FIG. 2 is utilized to parallel decode the user signals. The process is then repeated when a new frame is received.

Figure 4:
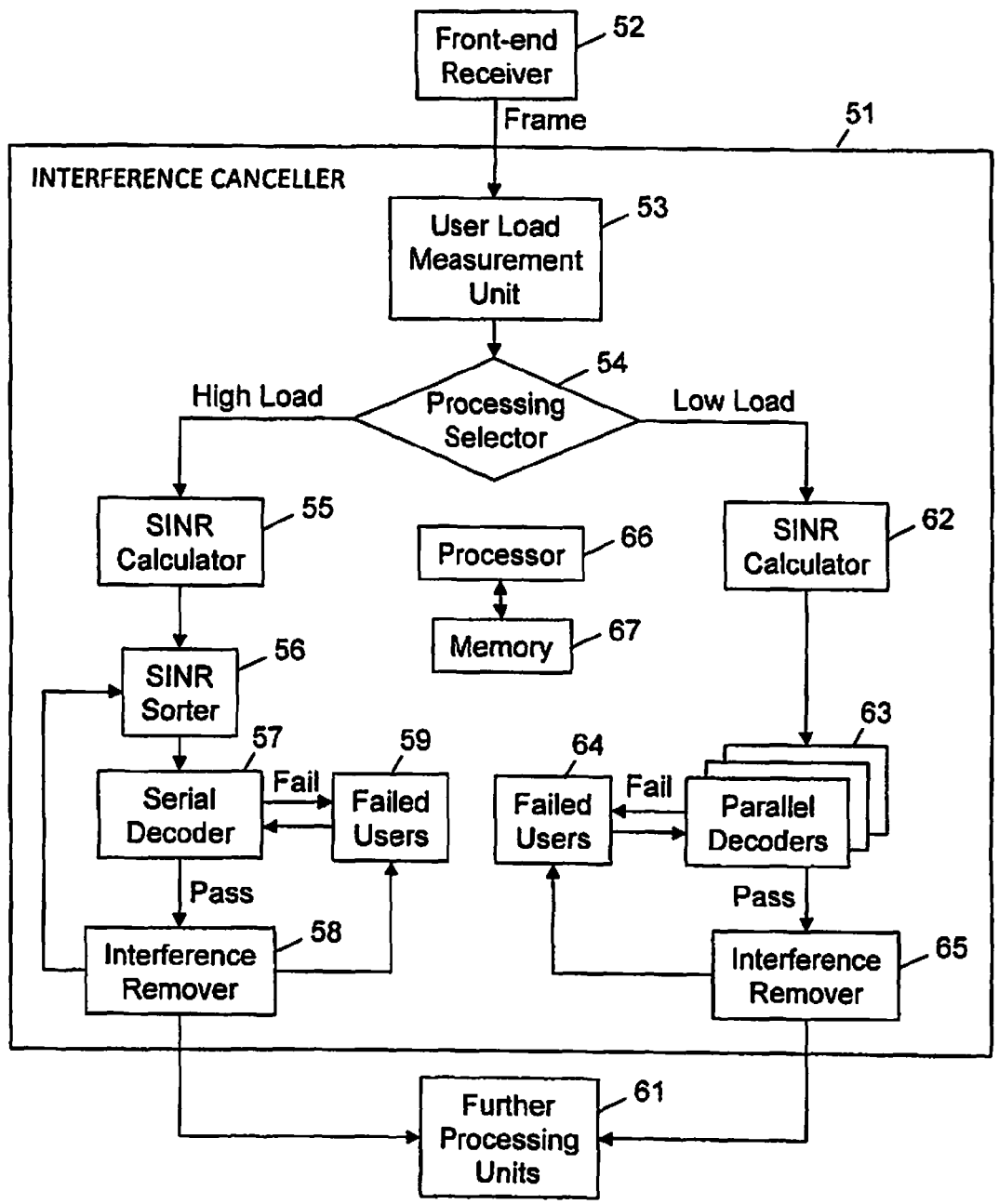
FIG. 4 is a simplified block diagram of an exemplary embodiment of an interference cancellation unit of the present invention.

FIG. 4 is a simplified block diagram of an exemplary embodiment of an interference canceller 51 of the present invention. A front-end receiver 52 such as, for example, a RAKE receiver receives the radio signals from the multiple users and provides signal information to a user load measurement unit 53 to determine the number of user signals within a received radio signal. A processing selector 54 compares the user load with a threshold load value to determine whether the load is high or low. If the load is high (i.e., a large number of user signals), the selector selects a first signal processing chain, which performs the method of FIG. 1. If the load is low (i.e., a small number of user signals), the selector selects a second signal processing chain, which performs the method of FIG. 2.

For a high load, an SINR calculator 55 in the first signal processing chain provides average SINR values to an SINR sorter 56, which sorts the users based on average SINR in descending order. A serial decoder 57 attempts to decode the user signals one at a time, starting with the user signal with the highest SINR. After the first user signal, any user signals that fail are bypassed, and the decoder attempts to decode the user signal with the next lowest SINR. Whenever a user signal is successfully decoded, the decoder forwards the decoded user signal to an interference remover 58, which removes the interference contribution of the decoded user signal. The process then determines from a failed user list 59 whether any user signals with higher SINR failed. If so, the process returns to the top of the list and attempts to decode the failed user signals in descending SINR order. When the interference from all of the decoded users has been removed from the signal, or the end of the list is otherwise reached, the received signal is sent to further processing units 61 to recover the transport block.

For a low load, an SINR calculator 62 in the second signal processing chain provides average SINR values to a set of parallel decoders 63. The SINR calculator 62 may be the same as the SINR calculator 55, or may be a separate SINR calculator. The parallel decoders attempt to decode all of the user signals simultaneously. After a first iteration, failed users are noted in a failed user list 64, and successfully decoded user signals are passed to an interference remover 65 (which may be the same as interference remover 58). The decoders may perform additional iterations of parallel decoding attempts until either all of the users are successfully decoded, or all of the remaining users fail in a given iteration. The received signal is then sent to the further processing units 61 to recover the transport block.

The operation of the interference canceller 51 may be controlled by a processor 66 executing computer program instructions stored on a memory 67. Alternatively, the interference canceller may be implemented in hardware, firmware, or a combination of software, hardware, and firmware.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a radio receiver node for canceling multi-user interference in a single-carrier radio communication system in which a front-end receiver receives a radio signal formatted in a sequence of frames, and each frame includes a number of user signals, each user signal contributing to the multi-user interference, the method comprising the steps of:
   determining for each frame, whether the number of user signals is greater than or equal to a threshold value;
   upon determining that the number of user signals is greater than or equal to the threshold value, serially decoding and removing the interference contributions of the user signals one at a time; and
   upon determining that the number of user signals is less than the threshold value, simultaneously decoding and removing the interference contributions of the user signals in parallel.

2. The method according to claim 1, wherein the step of serially decoding and removing the interference contributions includes the steps of:
   sorting the user signals according to signal quality in descending order starting with the user signal with the highest signal quality;
   attempting to decode the user signal having the highest received signal quality; and
   when the user signal having the highest received signal quality is successfully decoded:

removing from the received signal, the interference contribution of the user signal having the highest received signal quality; and attempting to decode subsequent user signals in descending order of received signal quality.

3. The method according to claim 2, wherein the step of serially decoding and removing the interference contributions also includes the steps of:

when one or more subsequent user signals fail to be decoded, bypassing each of the failed user signals and attempting to decode a next subsequent user signal;

when the next subsequent user signal is successfully decoded:

remove from the received signal, the interference contribution of the next subsequent user signal; and re-attempting to decode the previously failed user signals in descending quality order; and stopping the method when all user signals have been successfully decoded or when all remaining undecoded user signals have twice failed decoding attempts.

4. The method according to claim 1, wherein the step of simultaneously decoding and removing the interference contributions of the user signals in parallel includes the steps of:

attempting to simultaneously decode all of the user signals utilizing parallel decoders;

when at least one of the user signals is successfully decoded:

removing from the received signal, the interference contributions of the decoded user signals;

determining whether there are any user signals that failed the decoding attempt; and when there are user signals that failed the decoding attempt, attempting to simultaneously decode all of the failed user signals utilizing the parallel decoders.

5. The method according to claim 4, wherein the step of simultaneously decoding and removing the interference contributions of the user signals in parallel also includes performing additional attempts to simultaneously decode all of the failed user signals until all user signals have been successfully decoded or when a decoding attempt does produce any successfully decoded user signals.

6. The method according to claim 1, wherein the received signal quality is determined as an average signal-to-interference-plus-noise ratio (SINR) for each user signal.

7. A radio receiver system in a single-carrier radio communication network for receiving a radio signal comprising a plurality of user signals and for canceling multi-user interference between the plurality of received user signals, wherein the radio signal is formatted in a sequence of frames, and each frame includes the plurality of user signals, the receiver system comprising:

a front-end receiver for detecting the radio signal and outputting the plurality of user signals;

a first signal processing chain that serially decodes and removes the interference contributions of the user signals;

a second signal processing chain that simultaneously decodes and removes the interference contributions of the user signals in parallel; and a processing selector for selecting the first signal processing chain or the second signal processing chain for processing each received frame, wherein a processor controls the processing selector to select the first signal processing chain when the number of user signals is greater than or equal to a threshold value, and to select the second signal processing chain when the number of user signals is less than the threshold value.

8. The receiver system according to claim 7, wherein the first signal processing chain includes:

means for sorting the user signals according to signal quality in descending order starting with the user signal with the highest signal quality;

a decoder for attempting to decode the user signal having the highest received signal quality, and when the user signal having the highest received signal quality is successfully decoded, for attempting to decode subsequent user signals in descending order of received signal quality; and an interference removal unit for removing from the received signal, the interference contribution of user signals that are successfully decoded;

wherein the processor controls the decoder to bypass any of the user signals that fail to be decoded, and to attempt to decode a next subsequent user signal;

wherein, when the next subsequent user signal is successfully decoded, the processor controls the decoder to re-attempting to decode the previously failed user signals in descending quality order; and wherein the processor controls the first signal processing chain to stop decoding attempts when all user signals have been successfully decoded or when all remaining undecoded user signals have twice failed decoding attempts.

9. The receiver system according to claim 7, wherein the second signal processing chain includes:

a number of parallel decoders for simultaneously decoding the user signals in parallel; and an interference removal unit for removing from the received signal, the interference contribution of user signals that are successfully decoded;

wherein when there are user signals that failed the parallel decoding attempt, the processor controls the second signal processing chain to perform additional parallel decoding attempts to decode all of the failed user signals until all user signals have been successfully decoded or when a decoding attempt does not produce any successfully decoded user signals.

10. The receiver system according to claim 7, wherein the radio communication network is a Code Division Multiple Access (CDMA) network, and the front-end receiver is a RAKE receiver.

* * * * *